United States Patent
Cragun et al.

(10) Patent No.: US 11,785,081 B2
(45) Date of Patent: *Oct. 10, 2023

(54) DATA SYNC ENGINE, METHOD AND SOFTWARE

(71) Applicant: MX Technologies, Inc., Lehi, UT (US)

(72) Inventors: Jason Cragun, Pleasant Grove, UT (US); Adam Hutchison, Provo, UT (US); Lonnie Kyser, Pleasant Grove, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,294

(22) Filed: Jan. 11, 2022

(65) Prior Publication Data

US 2022/0131940 A1    Apr. 28, 2022

Related U.S. Application Data

(63) Continuation of application No. 17/013,854, filed on Sep. 7, 2020, now Pat. No. 11,349,919, which is a continuation of application No. 13/694,520, filed on Dec. 7, 2012, now Pat. No. 10,771,548.

(51) Int. Cl.
*G06F 15/16* (2006.01)
*H04L 67/1095* (2022.01)

(52) U.S. Cl.
CPC ................... *H04L 67/1095* (2013.01)

(58) Field of Classification Search
CPC .............. H04L 67/1095; G06F 16/178; G06F 16/1873; G06F 16/2358; G06F 16/27; H04M 2203/554
See application file for complete search history.

(56) References Cited

U.S. PATENT DOCUMENTS

| | | |
|---|---|---|
| 8,489,742 B2 | 7/2013 | Clubb et al. |
| 8,621,025 B2 | 12/2013 | Ridgard et al. |
| 11,349,919 B2 * | 5/2022 | Cragun ............... H04L 67/1095 |
| 2004/0133622 A1 | 7/2004 | Clubb et al. |
| 2006/0070019 A1 | 3/2006 | Vishnumurty et al. |
| 2006/0230349 A1 * | 10/2006 | Novak ................. G06F 11/327 |
| | | 714/E11.187 |
| 2008/0010372 A1 | 1/2008 | Khedouri et al. |

(Continued)

*Primary Examiner* — John B Walsh
(74) *Attorney, Agent, or Firm* — Kunzler Bean & Adamson

(57) ABSTRACT

Apparatuses, systems, methods, and program products are disclosed for data synchronization. An apparatus includes a processor and a memory that stores code executable by the processor to maintain a list of user devices for a user that are enabled for communicating with a core computer system, maintain lists of data changes made to the database of user data separately for each of the user devices, prefilter the data changes for the user devices such that only preselected types of data changes are used to update the user data on the user devices, in response to detecting a data change to the user data for at least one of the user devices, send a real-time notification to other user devices for the user of the data change to prompt data synchronization on the other user devices, and delete a list of the data changes in response to receiving a synchronization token.

20 Claims, 2 Drawing Sheets

(56) References Cited

U.S. PATENT DOCUMENTS

| | | | |
|---|---|---|---|
| 2009/0157732 A1* | 6/2009 | Hao | H04M 3/53325 |
| | | | 707/999.102 |
| 2011/0269424 A1 | 11/2011 | Multer et al. | |
| 2012/0011143 A1 | 1/2012 | Nash et al. | |
| 2012/0089572 A1 | 4/2012 | Raichstein et al. | |
| 2012/0190386 A1 | 7/2012 | Anderson | |

* cited by examiner

DATA SYNC ENGINE, METHOD AND SOFTWARE

CROSS-REFERENCES TO RELATED APPLICATIONS

This is a continuation application of and claims priority to U.S. patent application Ser. No. 17/013,854 entitled "DATA SYNC ENGINE, METHOD AND SOFTWARE" and filed on Sep. 7, 2020, for Jason Cragun, which is a continuation application of and claims priority to U.S. patent application Ser. No. 13/694,520 entitled "DATA SYNC ENGINE, METHOD AND SOFTWARE" and filed on Dec. 7, 2012, which is incorporated herein by reference.

BACKGROUND

The invention relates to the field of synchronizing data between a core computer system and one or more devices which may connect to and interact with the core computer system from time to time. As an illustrative example for the purposes of this document, a personal financial management ("PFM") software system is used as an example. A personal financial management software system can allow a user to view bank account balances and transactions, move money from one account to another, pay bills, conduct personal budgeting, and perform other functions.

In the prior art, a PFM software system stored user data on a core computer system. A user could use another computing device, such as a mobile computing device ("MCD"), to connect to the core computer system and download the user's data. Currently smart phones are popular MCDs. However, tablet computers, laptop computers, and other electronic devices can be used as MCD's. On the MCD the user can review his or her downloaded data. If the MCD remains connected to the core computer system, then the user can also change the data or perform other transactions with the core computer system. But if the user does not remain connected to the core computer system, then the user is limited to reviewing data downloaded to the MCD.

The prior art situation posed several inconvenient problems for the user and for the provider of the core computer system. First, a user who lost connectivity with the core computer system, such as due to loss of internet connection, lost the ability to edit data or conduct transactions. Second, even while editing data or conducting transactions, a user was faced with inherent slowness of the connection to the core computer system or slowness of the core computer system itself. Third, in order to support simultaneous on-line transaction processing for numerous users, both the core computer system and its connectivity for users needed to be very robust and therefore expensive. Also, connections with multiple devices must be managed.

SUMMARY

Apparatuses, systems, methods, and program products are disclosed for data synchronization. An apparatus includes a processor and a memory that stores code executable by the processor to, in one embodiment, maintain a list of user devices for a user that are enabled for communicating with a core computer system. The core computer system may store a database of user data for the user. In further embodiments, the code is executable by the processor to maintain lists of data changes made to the database of user data separately for each of the user devices. A data change associated with one user device may be added to a list of data changes to be updated on a different user device. In one embodiment, the code is executable by the processor to delete a list of data changes for a user device in response to receiving a synchronization token that indicates that the data changes have been made successfully on the user device.

In certain embodiments, the code is executable by the processor to prefilter the data changes for the user devices such that only preselected types of data changes are used to update the user data on the user devices. In one embodiment, the code is executable by the processor to, in response to detecting a data change to the user data for at least one of the user devices, send a real-time notification to other user devices for the user of the data change to prompt data synchronization on the other user devices.

A system, in one embodiment, includes a core computing system and a database communicatively coupled to the core computing system. The database may include user data for a user. In certain embodiments, the core computing system maintains a list of a plurality of user devices for the user that are enabled for communicating with the core computer system to access the user data stored on the database. In certain embodiments, the core computing system maintains lists of data changes made to the database of user data separately for each of the plurality of user devices. A data change that is associated with at least one user device of the plurality of user devices may be added N to a list of data changes to be updated on different user devices of the plurality of user devices.

In one embodiment, the core computing system prefilters the data changes for each of the plurality of user devices such that only preselected types of data changes are used to update the user data on the plurality of user devices. In some embodiments, the core computing system, in response to detecting a data change to the user data for at least one of the plurality of user devices, sends a real-time notification to other user devices of the plurality of user devices for the user of the data change to prompt data synchronization on the other user devices of the plurality of user devices. In one embodiment, the core computing system deletes a list of data changes for a user device in response to receiving a synchronization token that indicates that the data changes have been made successfully on the user device.

An apparatus, in one embodiment, includes means for maintaining a list of user devices for a user that are enabled for communicating with a core computer system. The core computer system may store a database of user data for the user. In one embodiment, the apparatus includes means for maintaining lists of data changes made to the database of user data separately for each of the user devices. In some embodiments, a data change associated with one user device is added to a list of data changes to be updated on a different user device.

In one embodiment, the apparatus includes means for prefiltering the data changes for the user devices such that only preselected types of data changes are used to update the user data on the user devices. In various embodiments, the apparatus includes means for, in response to detecting a data change to the user data for at least one of the user devices, sending a real-time notification to other user devices for the user of the data change to prompt data synchronization on the other user devices. In one embodiment, the apparatus includes means for deleting a list of data changes for a user device in response to receiving a synchronization token that indicates that the data changes have been made successfully on the user device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
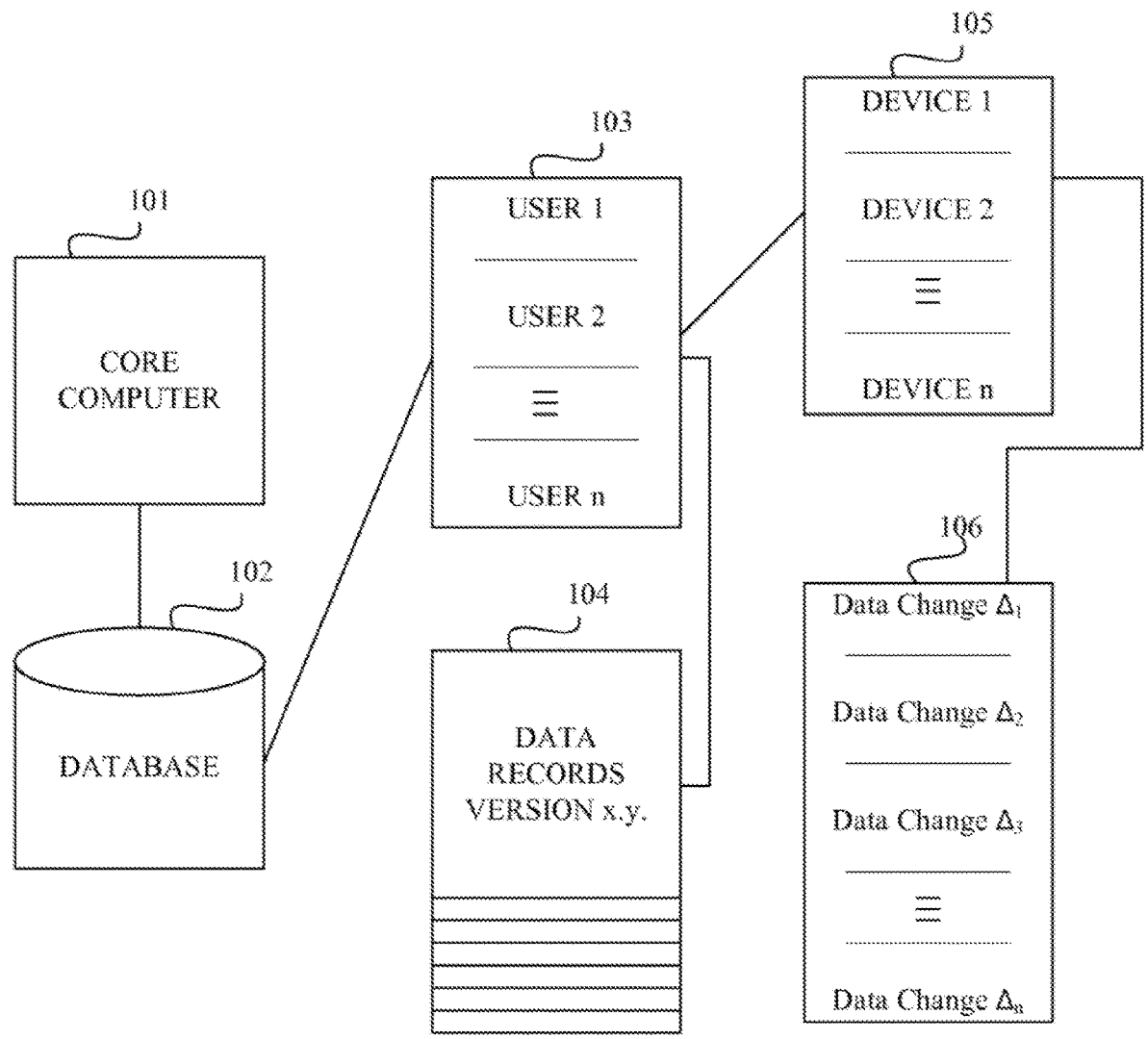
FIG. 1 depicts a core computer system, its database, and information that it may contain.

Referring to FIG. 1 an example embodiment of the invented system is depicted. A core computer system 101 for a software application, such as a PFM program, is shown. The core computer system 101 has a database 102 on which data for the PFM for all of its users may be stored. The database 102 can include information such as a list of users 103 including user 1, user 2, . . . up to user n where n is a positive integer. That list of users can include various user information, such as user account information, security information, etc. For each user, such as user 2, a list of enabled computing devices 105 is kept. These devices such as device 1, device 2, . . . device n, can include devices such as a desktop computer, a laptop computer, a notebook computer, a tablet computer, a smart phone, and another type of device capable of communicating with the core computer system 101. Also for each user such as user 2, the database 102 can contain data records 104 pertaining to that user. In the example of a PFM, the data records could include various information about bank accounts, account transactions, bills that need to be paid, bills that have already been paid, personal budget information, etc. For each device 105 that can connect to the core computer system for a particular user, in this case device 2 for user 2, the database 102 may store a number of data changes 106, such as data change δ1 through data change δn, which need to be made to data on device 2 for user 2 in order to sync the data of device 2 with data in the database 102 of the core computer system.

In the example of a PFM software system, the data changes δ1 through δn could be changes coming from third parties, such as interest paid on bank accounts reported by the relevant financial institutions and which need to be reflected on all copies of the user's data. Or the data changes could be due to changes in the database made by the user through a different device. For example, if the user connected to the core computer system through device 5 and entered a transaction, such as payment of a bill, then data reflecting that change would not exist on the copy of the user's data maintained in device 3. Therefore the core computer system keeps a record that the data change made to the core computer system needs to be made for each other device up to device n. When each device connects to the core computer system, then the data change can be made to or published to that particular device. For more detail on this, see FIG. 2.

Figure 2:
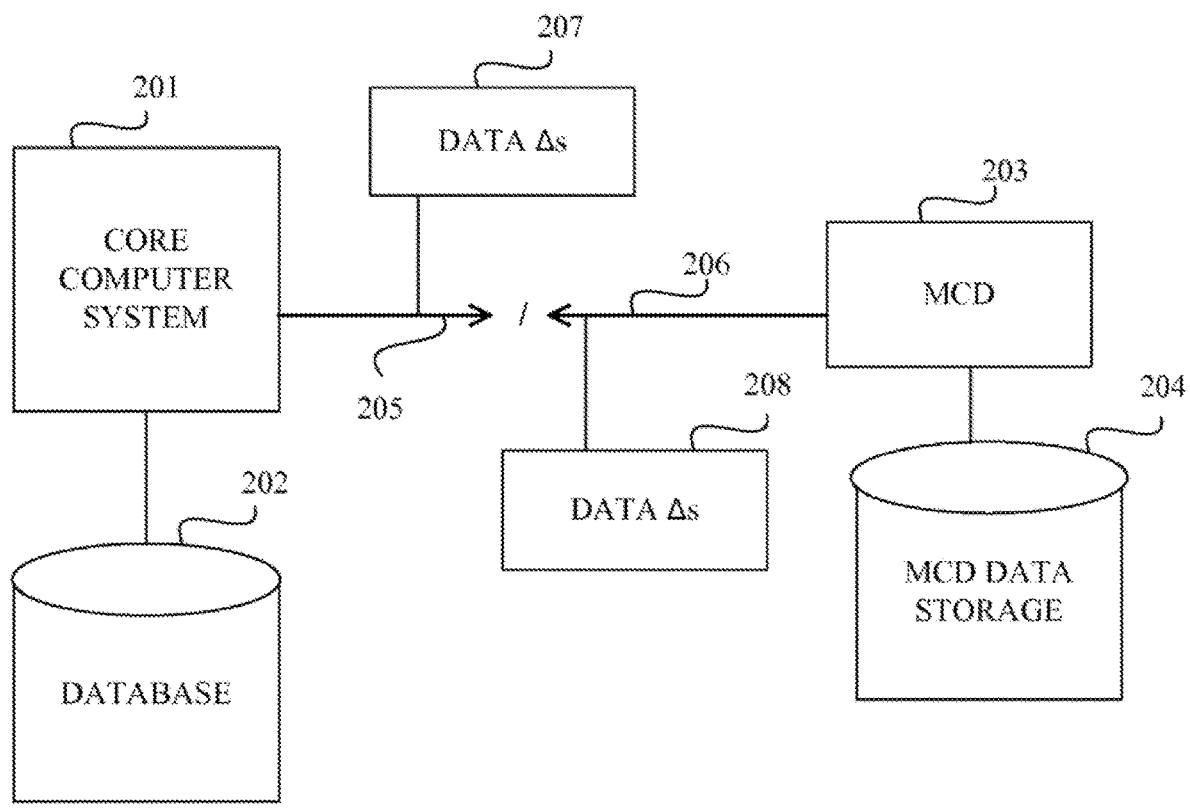
FIG. 2 depicts connection of a core computer system with another device and the data and data record changes which may be shared between them.

Referring to FIG. 2, a depiction of data change transactions between a core computer system and a device connectable to it is provided. The core computer system 201 has a database 202 for storing user data. The core computer system is at least periodically in connection with an MCD 203. The connection can be via any desired connection means, including but not limited to the Internet. The MCD had an MCD data storage 204 where it can store user data. The database 202 of the core computer system may have changes to data for a particular user which need to be implemented on that user's devices. In that event, for each device, there will be an applicable set of data changes 207 on the core computer system which can be transmitted 205 to the MCD in order to update the MCD's data set. Likewise, then an MCD user is not connected to the core computer system and makes changes to his or her data, then those changes need to be reflected in the core computer system database data set. Therefore when the MDC is connected to the core computer system, the MCD data changes 208 are transmitted 206 to the core computer system and the contents of the core computer system are updated. This allows the data storage of the core computer system and the MCD to be brought into sync.

It is important for the core computer system to keep a record of the last changes to the data set on each of a user's devices. And the core computer must keep track of changes to its own data set which have not yet been made on the user's various devices. This will allow the core computer system to notify a user's device of the need to update its data set whenever a user's device connects to the core computer system, thus keeping data sets in sync. The core computer system can keep track of the types of changes on a record-by-record basis (such as created, updated, deleted) so that the next time a device connects to the core computer system, those data records can be updated in the device's data set. This could occur by the core computer system forcing the user device to update its data set, such as by the core computer system sending out a syncpackage of data to be updated, or by the user device requesting the core computer system to provide it with updated data. In the event that a syncpackage is used, it can be pre-filtered to send only the types of data changes desired rather than sending all data changes, if filtering is appropriate.

At the completion of the sync process, whether the core computer system is updating a user device or whether a user device is updating the core computer system, it is possible for the data changes which were stored for the sync process to be purged. This could occur by the device that is being updated sending a delete request or a sync token indicating that the desired data changes have been made successfully, so the record of those proposed data changes can be deleted.

It is also possible to set up the core computer system so that it keeps track of which devices know about which data changes. Therefore it is possible for the core computer system to separately notify each user device of the particular data changes that the device in question does not know about yet. That enables the core computer system to immediately bring any particular device up to date with its data changes as soon as that device connects to the core computer system. Because only the data which is changed is downloaded to the user device, data transfer is rapid. The user device can signal the core computer system that it successfully received the data changes with a handshake or other protocol. Then the core computer system starts with a blank slate of proposed data changes for that particular device until more data changes are made.

It is possible for the core computer system to require a user device to download a fresh complete data set instead of downloading just data changes. This could be done if the number of data changes is deemed too large and a complete data set download is preferable. Or it could be done if the user device data set is stale due to age, for example if a device has not connected to the core computer system for 90 days or some other predetermined period of time.

The core computer system can also be updated with push notifications (typically sent for individual changes). This allows the core computer system to push or force a data update on a user device rather than waiting for a device to request data sync. The core computer system can open a socket and talk to the user device to provide real time updates. Push notifications can be real-time daily, or according to whatever threshold the software designer feels is most appropriate.

On the user device side, data-state tracking can also be used, permitting the user device to keep track of all data records that were created, updated or deleted so that appropriate data changes may be sent to the core computer system. In such case, the user device notes which data changes have occurred since the last data sync and prepares them for upload to the core computer system when connection next occurs. The data changes can be ordered as desired to guarantee certain relationships (i.e., categories and transactions, so that a transaction is tied to an appropriate category, establishment of a new category when required to support the transaction, etc.). Then the user device can push the data to the core computer system.

The system can also be designed to maintain a status code for each proposed data change. Status codes can indicate which data changes were successful and which ones were not, returning a message to the user for unsuccessful data changes. Status codes can indicate a successful or unsuccessful data change, as well as action to be taken. For example, (i) clear the data state, (ii) keep it the same, (iii) show an error state.

The invention can be implemented as software that runs on a digital computer. The state of technology and trends as of the time of writing this document indicates that digital computers running software will be a preferred implementation for many years to come. For the purposes of this document, the term "digital computer" includes desktop computers, laptop computers, tablet computers, hand-held mobile electronic devices (including so-called smart phones), other mobile electronic devices, networked computers, mainframe computers, and other computing devices. Other computing devices may include analog computing devices, quantum computing devices, biological computing devices and other computing devices. Although the invention can be implemented as software operating on a computing device, the invention can also be implemented as firmware or it may be implemented in hardware or otherwise as desired. Such implementations are intended to be within the scope of the invention.

Commonly a computing device for using the invention will include a display device such as a screen or other image on which information can be displayed to a user, an input device through which a user can control the computing device, and a processor for carrying out computations as required by the invention. The computing device may also include a means for carrying wireless transmission and receipt of data, dynamic memory, static memory, a power source such as a battery, and other features.

While the present invention has been described and illustrated in conjunction with a specific embodiment, those skilled in the art will appreciate that variations and modifications may be made without departing from the principles of the invention as herein illustrated, described, and claimed. The present invention may be embodied in other specific forms without departing from its spirit or essential characteristics. The described embodiment is to be considered in all respects as only illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. An apparatus, comprising:
a processor; and
a memory that stores code executable by the processor to:
maintain a list of user devices for a user that are enabled for communicating with a core computer system, the core computer system storing a database of user data for the user;
maintain lists of data changes made to the database of user data separately for each of the user devices, wherein a data change associated with one user device is added to a list of data changes to be updated on a different user device;
prefilter the data changes for the user devices such that only preselected types of data changes are used to update the user data on the user devices;
in response to detecting a data change to the user data for at least one of the user devices, send a real-time notification to other user devices for the user of the data change to prompt data synchronization on the other user devices; and
delete a list of the data changes for a user device in response to receiving a synchronization token that indicates that the data changes have been made successfully on the user device.

2. The apparatus of claim 1, wherein the code is executable by the processor to order the data changes to maintain relationships with the user data, the relationships comprising a relationship between a transaction and a transaction category so that a transaction is tied to an appropriate category, wherein a new transaction category is established when necessary to support a transaction.

3. The apparatus of claim 1, wherein the real-time notification comprises a push notification that forces synchronization of the user data on a user device, the push notification sent in response to an individual change of the user data.

4. The apparatus of claim 1, wherein the code is executable by the processor to, in response to a user device connecting to the core computer system within a predetermined period of time since a previous synchronization event for the user device, synchronize data changes of the user data with the user device.

5. The apparatus of claim 1, wherein the code is executable by the processor to force a complete synchronization of the user data on a user device from the core computer system in response to the user device not connecting to the core computer system within a predetermined period of time.

6. The apparatus of claim 1, wherein the data changes comprise created records, updated records, and deleted records.

7. The apparatus of claim 1, wherein the lists of data changes comprise data changes from a third party source.

8. The apparatus of claim 7, wherein the third party data source comprises a financial institution.

9. The apparatus of claim 1, wherein the code is executable by the processor to, in response to the number of data changes exceeding a threshold, force user devices to download a complete data set of user data rather than downloading data changes.

10. The apparatus of claim 1, wherein the code is executable by the processor to receive data state tracking data from at least one of the user devices.

11. The apparatus of claim 10, wherein the data state tracking data comprises one or more of updated data, new data, and deleted data reflecting data changes made on at least one of the user devices.

12. A system, comprising:
a core computing system comprising a processor; and
a database communicatively coupled to the core computing system, the database comprising user data for a user, wherein the core computing system:
   maintains, by the processor, a list of a plurality of user devices for the user that are enabled for communicating with the core computer system to access the user data stored on the database;
   maintains, by the processor, lists of data changes made to the database of user data separately for each of the plurality of user devices, wherein a data change associated with at least one user device of the plurality of user devices is added to a list of data changes to be updated on different user devices of the plurality of user devices;
   prefilters, by the processor, the data changes for each of the plurality of user devices such that only preselected types of data changes are used to update the user data on the plurality of user devices;
   in response to detecting a data change to the user data for at least one of the plurality of user devices, sends, by the processor, a real-time notification to other user devices of the plurality of user devices for the user of the data change to prompt data synchronization on the other user devices of the plurality of user devices; and
   deletes, by the processor, a list of the data changes for a user device in response to receiving a synchronization token that indicates that the data changes have been made successfully on the user device.

13. The system of claim 12, wherein the core computing system orders, by the processor, the data changes to maintain relationships with the user data, the relationships comprising a relationship between a transaction and a transaction category so that a transaction is tied to an appropriate category, wherein a new transaction category is established when necessary to support a transaction.

14. The system of claim 12, wherein the real-time notification comprises a push notification that forces synchronization of the user data on a user device, the push notification sent in response to an individual change of the user data.

15. The system of claim 12, wherein the core computing system, in response to a user device connecting to the core computer system within a predetermined period of time since a previous synchronization event for the user device, synchronizes, by the processor, data changes of the user data with the user device.

16. The system of claim 12, wherein the core computing system forces, by the processor, a complete synchronization of the user data on a user device from the core computer system in response to the user device not connecting to the core computer system within a predetermined period of time.

17. The system of claim 12, wherein the lists of data changes comprise data changes from a third party source.

18. The system of claim 12, wherein the core computing system receives, by the processor, data state tracking data from at least one of the user devices.

19. The system of claim 18, wherein the data state tracking data comprises one or more of updated data, new data, and deleted data reflecting data changes made on at least one of the user devices.

20. An apparatus, comprising:
means for maintaining a list of user devices for a user that are enabled for communicating with a core computer system, the core computer system storing a database of user data for the user;
means for maintaining lists of data changes made to the database of user data separately for each of the user devices, wherein a data change associated with one user device is added to a list of data changes to be updated on a different user device;
means for prefiltering the data changes for the user devices such that only preselected types of data changes are used to update the user data on the user devices;
means for, in response to detecting a data change to the user data for at least one of the user devices, sending a real-time notification to other user devices for the user of the data change to prompt data synchronization on the other user devices; and
means for deleting a list of the data changes for a user device in response to receiving a synchronization token that indicates that the data changes have been made successfully on the user device.

* * * * *